Figure 1:
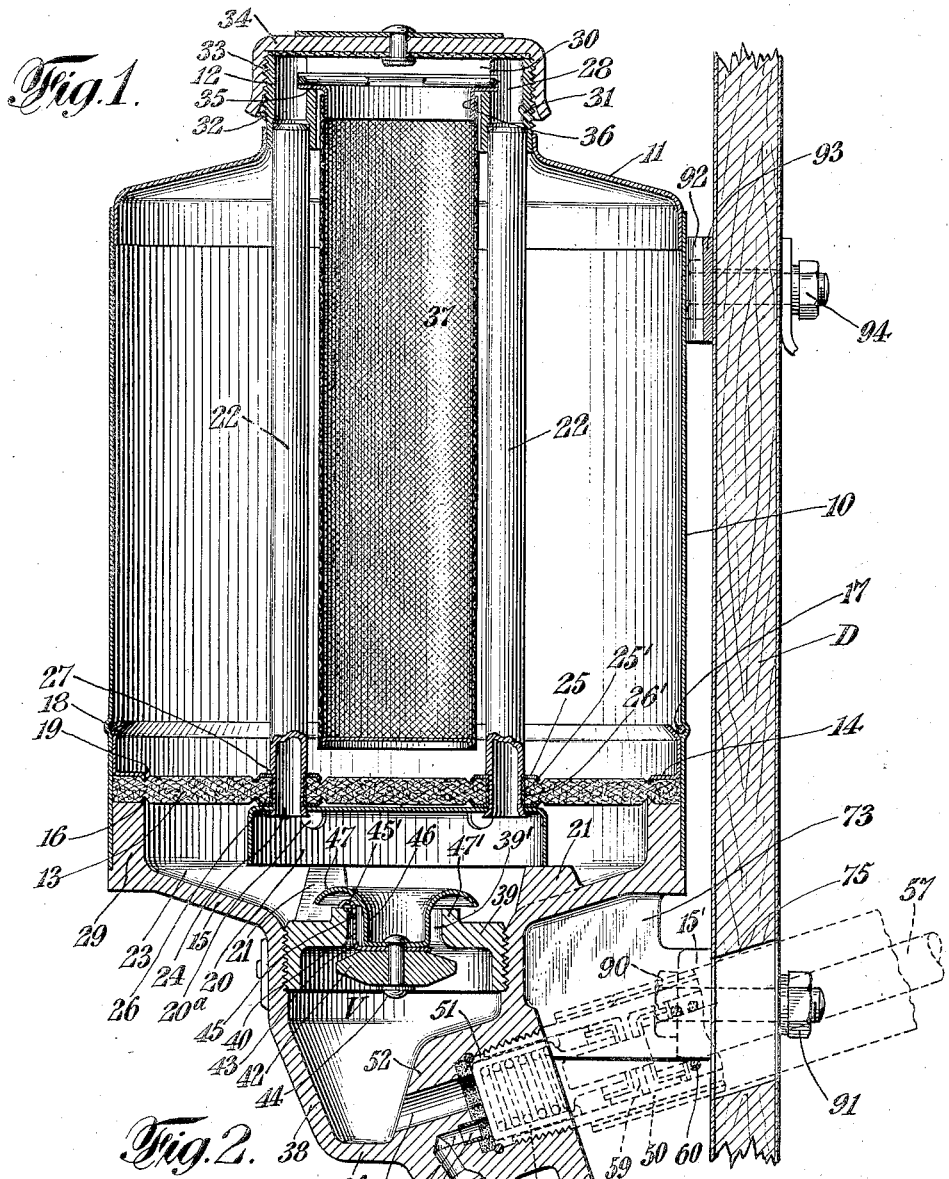

June 14, 1927.  
J. BIJUR  
1,632,774  
ELEMENT OF LUBRICANT SUPPLY INSTALLATIONS  
Filed Aug. 28, 1926

Inventor  
Joseph Bijur  
By his Attorneys  
Dean, Fairbank, Obrieght & Hirsch.

Patented June 14, 1927.

1,632,774

UNITED STATES PATENT OFFICE.

JOSEPH BIJUR, OF NEW YORK, N. Y., ASSIGNOR TO AUTO RESEARCH CORPORATION, A CORPORATION OF DELAWARE.

ELEMENT OF LUBRICANT SUPPLY INSTALLATIONS.

Application filed August 28, 1926. Serial No. 132,141.

My present invention relates primarily to central pressure lubrication and is more especially concerned with the parts for storing the lubricant and governing the flow thereof into the pipe system under the impulse of any appropriate pump or other pressure source.

It is an object of the invention to provide a reservoir construction of the character set forth which assures the delivery of only clean oil to the piping system and the valve seats near the head thereof even though the oil originally poured into the reservoir may have foreign particles therein.

Another object is to provide a reservoir of the type set forth, which will effectively exclude foreign matter from the lubricant stored therein, without, however, thereby becoming air-bound.

Another object is to provide a reservoir, of the character set forth, the operativeness of which is not dependent on the use of lubricant of a definite viscosity.

A feature of the reservoir in a preferred mode of execution thereof, is a filter pad thereacross for intercepting any solid particles from the oil before it reaches the pipe line. In a preferred embodiment, the oil seeps through the filter pad and by way of a drain port to a settling cup therebelow constituting a part of or immediately associated with the reservoir. The settling cup is vented through one or more tubes extending preferably through the filter pad and opening to the exterior of the reservoir, the vent openings being appropriately guarded or shielded to prevent entry of dust or clogging thereby. Within the settling cup is a check valve closed during the effective operation of the system, to sustain the propulsive pressure without hindering the entry of oil into the settling cup in the intervals between operation.

When the level of oil in the reservoir becomes low, so that some air could flow past the drain port into the settling cup, the prompt seating of the valve at the beginning of the pump discharge, would trap air which would be compressed as the pump stroke proceeds causing disturbances, more especially in a pipe system, the correct distribution from which depends on maintaining it completely filled with oil. Similar adverse operation might occur even when the level of oil in the reservoir is substantial, this due to cavitation and the drawing of air during pump suction stroke past the check valve from above the upper level of oil thereabove in the reservoir.

It is, accordingly, another object of the invention to provide apparatus of the character set forth, affording a lubricant reservoir that may be used to supply the bearings through an intervening oil-filled piping system, and by the propulsive agency of a pump having a tight fitting piston, yet without permitting the disturbances due to forcing air into the piping system, especially when the pump is operated with the reservoir nearly depleted of oil.

For accomplishing the object last stated, I provide a device or arrangement of parts to automatically relieve, vent or expel any air from near the head of the installation without forcing the same through the length of the pipe system to the bearings, said device, however, operating selectively to sustain pump pressure, applied thereat through lubricant, and by virtue of the viscosity of the lubricant.

The air rejecting device may be a valve, preferably the check valve previously referred to, which is open during the charging stroke of the pump, and is so constructed as to remain open as long as any air is urged thereby from the settling cup in pump discharge, but closes when the valve during pump discharge, reaches or is reached by the oil therebelow.

In a preferred embodiment the pump discharges into the settling cup in the upper part of which the valve is disposed, said valve responding to the action of oil by reason of the viscosity thereof, to be levitated to its seat, thereabove, and subsequently sustaining the pressure upon the oil. The valve remains unseated under the influence of air, and has preferably a bevelled lower face to afford more ready escape of air thereby. The port through which the pump discharges into the settling cup is preferably directed away from the valve, so that the jet will be dissipated by forming a vortex and the fluid in the chamber will rise without much splashing, whereby the direct application of the jet to the valve with consequent premature seating thereof is prevented.

To permit effective withdrawal of the lubricant from the reservoir until nearly depleted, my invention also contemplates the provision of means for hindering cavitation in drawing a charge of oil. Said means preferably comprises a deflection member, cup, or plate of diameter larger than the drain port, and extending transversely thereacross, preferably thereabove. By the use of the deflection plate, the suction of the pump is applied laterally and peripherally between the deflection plate and the drain port, so that the suction on the body of the lubricant is distributed over a relatively wide area.

While the cavitation hindering device and the check valve in the reservoir may be separate and distinct parts, and both of said parts in turn may be distinct from the air rejecting device, I prefer to combine these elements into a single unitary assembly. For this purpose, the bottom of the reservoir is formed preferably as a frustro-conical chamber which constitutes the settling cup. This cup has a suction port near its bottom through which the pump withdraws lubricant from the reservoir and through which it transmits pressure or returns oil by reverse flow. The combined check and air rejecting valve is of diameter materially larger than the drain port through its seat, and extends laterally therebeyond so that the suction is applied only by lateral flow radially of the valve.

In a preferred embodiment, the valve is a metal button normally suspended substantially below its seat to preclude, when heavy oil is used, the formation of a film between the open valve and its seat, of such resistance as to prevent the rejection of air. The valve is preferably provided with a deflection plate or cup secured thereto and extending upward above the valve seat member with a flange protruding outward beyond the seat member, thereby hindering cavitation. The deflection plate in this case is so shaped as also to deflect downward the oil impinging thereon at the commencement of pump pressure and thereby assists in levitating the valve to its seat.

The present application is a continuation in part, of my copending applications Serial No. 580,668 filed August 9, 1922; Serial No. 662,195 filed September 12, 1923; and Serial No. 695,740 filed February 28, 1924. I claim herein the reservoir structure, the air rejecting and the cavitation hindering structure, per se and in combination. The pump and the combination thereof with the reservoir are claimed in my copending application Serial No. 131,640 filed August 26th, 1926, and in the divisions thereof, Serial No. 182,362, filed April 9th, 1927, and Serial No. 193,090, filed May 21, 1927.

Figure 2:
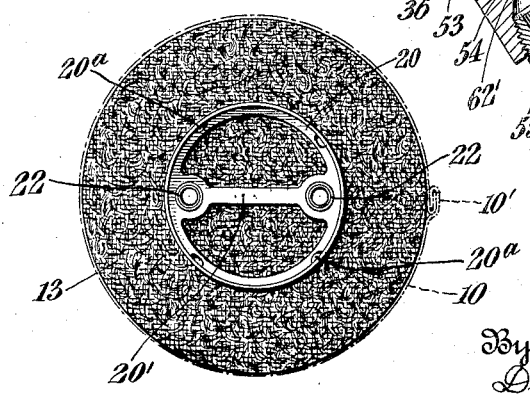
Figure 3:
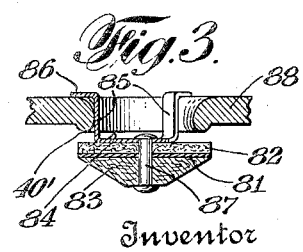

In the accompanying drawings in which are shown one or more of various possible embodiments of the several features of my invention, Fig. 1 is a view of the reservoir in vertical section, shown mounted on a dashboard and indicating in dot and dash-lines, a fragment of a pump that may be associated therewith, Fig. 2 is a bottom view of the filter assembly on a smaller scale, showing the contiguous part of the reservoir wall in dot and dash lines, and Fig. 3 is a fragmentary view of an alternative form of check valve in section.

The drawings show a reservoir comprising a cylindrical wall 10 into the upper end of which is telescoped a stamped metal cover 11 having a machined neck 12 friction-fitted and soldered thereinto. A filter disk 13 preferably of wool felt is peripherally clamped in position at the lower end of the cylinder, preferably between a stamped frame collar 14 thereabove and a cast reservoir bottom 15 therebelow. For assembly, the bottom is first soldered in place, the filter disk is laid thereon to rest upon upstanding ledge 16 of the bottom, whereupon stamped frame collar 14 and lock ring 17 are forced into place, the lock ring snapping into groove 18 of the reservoir. The frame collar 14 has an outstanding inner periphery 19 in registry with ledge 16. Thus, in the assembly, the periphery of the filter disk is securely clamped in place and substantially constricted where clamped, as shown. The soldering operation is thus performed before the filter disk is applied and the latter is not subjected to injury from the heat of soldering. To dispense with the need for off-sets in the filter edge, the clamping frame and the lock ring, which might be rendered necessary, to accommodate the seam of the reservoir, the inner face of the reservoir wall is made to come flush with the outer surface of the reservoir bottom by employing the lap seam 10' best shown in Fig. 2.

To relieve the filter of the weight of oil thereabove and of the suction effect due to the pump hereinafter referred to, a sheet metal backing cup 20 is provided, the rim of which rests on corresponding spaced lugs 21 formed therebelow, integral with the bottom 15. A pair of pipes 22 serve to vent the oil chamber 23 below the filter 13. These pipes extend through the filter and are spun over at their lower ends at 24 for attachment with respect to backing cup 20. To prevent leak of unfiltered oil along the vent pipes, flanged washers 25 and 26 about the vent pipes are pressed at their inturned outer rims into the opposite faces of the pad, a shoulder 27 on the vent pipe pressing the upper washer downward, the backing cup reacting to hold the lower washer upward. The flanged washers have hubs 25' and 26' respectively, which abut as shown, in the assembly, and thereby limit the constriction of the filter pad thereat. The backing cup 20 presents an open end to expose a maximum area of filter, the vent pipes being secured at a diametrical web 20''. To facilitate escape of air from below the periphery of the felt to the vent pipes, the lateral wall of the backing cup 20 has perforations 20ª at the upper rim thereof.

Pipes 22 at their upper ends extend into, and are sustained at bores 28 in the neck, the inner diameter of which is enlarged at its upper end at 30, so that the bores 28 break through for communication with the interior of the neck. The backing cup 20 performs the additional function of sustaining the pressure transmitted through vent pipes 22 in applying the neck 12, thereby protecting the filter from rupture, were such pressure applied thereto. An oblique bore 31 extends downward from one of the bores 28 through the neck and terminates at the undercut part 32 of thread 33 on the closure cap 34 of the reservoir, so that dirt is substantially excluded therefrom. This bore serves to vent the interior of the reservoir and through the vent pipes 22, the oil chamber 23. The rim 36 of a mesh wire or cloth strainer cup 37 is suspended from the neck, and secured in place by a split lock ring 35 lodged in a corresponding groove within the neck.

The reservoir bottom or settling chamber is concave or conformed as a vessel and has a rim or tray 29 of the diameter of the reservoir and a reduced integral axial frustro-conical air separating or settling cup 38 extending downward therefrom and closed at its smaller lower end 36. A check valve V is mounted near the upper and larger end of the cup and comprises a cage 39 threaded into the upper end of the cavity and providing a valve seat 40 with a drain or inlet port 39' therethrough to the settling cup. The valve has an effective seating area of ⅞ inch in diameter and comprises a solid metal button 42 with a beveled rim. It is normally suspended below the seat by a sheet metal valve hanger, so as to seat by a lift of about ⅛ inch. The hanger comprises a disk 43 secured to the valve button by rivet 44 and having upstanding fingers 45 serving to center the valve with respect to its seat and, turned outward at 45' to rest on top of the valve cage. On top of the valve hanger is provided a deflection plate or cup 46 secured in place by the same rivet 44 that connects the valve to its hanger, said deflection plate having an outwardly extending flange 47 curved over the hanger and valve for a purpose which will be apparent in the description of the operation below. The valve cage is preferably provided with an upstanding flange 47', which is overlapped by the flange 47, the rim of which is curved downward, as shown. The assembly of valve button, hanger and deflection plate has a weight of 1½ ounces. Valves of different dimensions and weight and hangers of different length may be used, but for absolute reliability in the operation which will be described below, some definite relation between the dimensions and the weight must be preserved. The specific construction of valve set forth has been found thoroughly reliable for widely different viscosities of the oil.

The cup 38 is preferably provided with a port 53 near the lower end thereof, through which lubricant may be withdrawn from the reservoir preferably by suction. While any appropriate suction device may be employed, I have indicated in part a pump more fully described and claimed in my copending application, Serial No. 182,362, filed April 9, 1927. It may be briefly noted here that this pump comprises a cylinder 50, the end of which is threaded into a corresponding socket 51, formed in the thickened part 52 of cup 38. The cylinder is provided with a manually withdrawn piston rod 57, carrying a tight fitting suction piston 59 and discharged by the expansion of coil spring 60 which encircles rod 57. Preferably the volume of the settling cup 38 below valve V is at least as great as the charge of the pump employed. The socket 51 in the cup 38 has a second port 54 through which lubricant is ejected in the discharge of the pump by way of nipple 55 to the pipe line (not shown). The piston is shown with an end structure 64 which in normal position closes the ports 53 and 54.

In a preferred embodiment, applied to a motor vehicle, the reservoir is mounted as indicated at Fig. 1, with the reservoir in front of the dashboard exposed to the heat of the engine and the pump handle extending in back of the dash for convenient operation from the driver's seat. The cast bottom 15 has integral flat lugs 15' thus brought into contact with the front of the dashboard, to which the installation is then secured by bolts 90 and coacting nuts 91 through the dashboard and the lugs. The upper part of the reservoir wall is provided with a short strap 92, soldered thereto, the end lugs 93 of which are clamped against the dashboard by bolts and nuts 94.

It will be seen that the rugged casting 15, not only sustains the weight of the various parts, but takes the pulling and pushing thrust of the pump. The reservoir wall 10, accordingly, can be and preferably is of light sheet metal, as shown.

In the charge stroke of the pump plunger, lubricant is admitted to the pump as rapidly as the piston is drawn outward, and this by reason of the large diameter and correspondingly low resistance of valve seat 40 and of port 53. By reason of the large diameter and substantial drop of valve V, and the conformation of deflection plate 47, the oil is drawn during suction, laterally upward and inward from about the periphery of the deflection plate 46 and around the upstanding flange 47' downward to the valve V, thence outward about the periphery of the valve. The oil being drawn inward radially about the relatively large periphery of plate 46, there is avoided the cavitation of oil and possible drawing in of air from above a substantial depth of lubricant, which might be incurred with the use of a valve, affording but a small aperture through which suction is applied to the oil directly thereabove. The settling chamber 23 from which the pump draws its charge being effectively vented through pipes 22, air-lock is precluded in the charge-drawing operation. It will be understood that the deflection plate 46 alone, extending above the valve port 39' and beyond the periphery thereof, hinders cavitation, but the combination shown is particularly effective for the purpose.

After the charging operation is completed, the pump piston travels inward and exerts discharge pressure upon the body of oil confined in the cylinder. By reason of the substantial resistance or viscosity of the oil, the valve V will be forced upward against its seat in the reservoir, acting as a check valve to prevent return of lubricant above the settling cup, and the lubricant is thus forced out of the pump cylinder through the length of the pipe system (not shown) and in parallel through the controlling outlets (not shown), the discharge continuing until the end 64 seats in the position shown in Fig. 1.

There being ordinarily a substantial interval between successive operations of the pump, operation once a day being usual, it follows that even when the lubricant in the reservoir is low, sufficient will have seeped through the filter disk 13 in the interval between operations to provide a filtered supply therebelow, from which the pump is charged. The pump will, therefore, operate effectively almost until the reservoir is completely drained of lubricant. The large filter 13 intercepts any solid particles of dust carried with the oil, and is thereby helpful to prevent clogging or other derangement of the control devices (not shown) in the neighborhood of the bearings, by the accumulation thereat of such foreign matter.

The apparatus described has a selective action to eject only oil through the nipple 55, the pump discharge in the absence of an available supply of oil causing the rejection of air, rather than to force it through said nipple into the pipe line. This property is of importance when the installation is employed with a pipe system, the reliability of the distribution of which depends on maintaining the pipe line from the pump to the control outlets completely filled with oil.

When the oil in the reservoir of my construction is down to a level below valve V, the pump charge being of volume no greater than that of cup 38, the plunger will draw only oil from said cup and in its discharge will return the oil to the cup. The air entering the cup from the reservoir as the pump is being charged, would, by reason of its low viscosity, exert insufficient lifting force in its subsequent return to the empty reservoir during pump discharge, to raise or seat the valve V. Thus, the cup 38 will always have a charge of oil therein greater than the charge of the pump, regardless how often the pump is operated with little or no oil in the reservoir. In general, the pipe line supplied from the pump is much more highly resistant to flow than the settling chamber 23, so that no check valve is required at the nipple 55 to prevent suction on the pipe line in charging the pump, although such valve may be employed, if desired.

When the level of the oil in the reservoir drops below the valve V, if a jet from the pump could impinge on valve V, it would be likely to force it upward against its seat and thereby trap air. This is obviated by directing the port 53, as shown, laterally at an angle to the valve V, so that the jet will not impinge thereon, the oil being ejected from the pump to the settling cup 38, wherein the velocity of the jet will be dissipated by forming a vortex, allowing the level of the oil to rise without much splashing, so that the air remains above the oil and passes the open valve before the oil level comes up to levitate the valve to its seat. The beveled edge of valve 42 guides the air in its escape about the valve rim.

Were the gap between the valve and seat to be sealed by a resistant film of oil, it would be possible with a nearly empty reservoir, for the pump in its discharge to force air from cup 38 into the pipe line rather than to cause the air to escape from between the valve and its seat. In the construction shown, the valve normally extends below its seat by a gap greater than would be spanned by a film of even highly viscous oil. While heavy oil would by virtue of its high viscosity reliably seat such valve without further safeguards, a lighter grade of oil might in such arrangement, pass back to the reservoir in pump discharge without lifting the valve. The outstanding flange 47 of the deflection plate 46 is directly in the path of oil returning to the reservoir, and acts by turning back and outwardly, oil impinging thereon, whereby the lifting impulse upon the valve is materially assisted during pump discharge and prompt seating is assured even when the oil is relatively light. The sustained pressure of the oil thereafter maintains the valve against its seat until the pump has completed its discharge, whereupon the valve will again drop by virtue of its weight to the position shown in the drawings.

I have shown a preferred arrangement in which the check valve that serves to limit or prevent return of oil during pump discharge to the reservoir, is conformed both to effect air rejection and to hinder cavitation, all as described in the foregoing. It will be understood that functionally, the anticavitation device which hinders the drawing of air into the pump from above a substantial layer of oil in the reservoir, is distinct from the check valve and said elements may be disposed within the reservoir as separate and distinct elements, as, for instance, in my copending application, Serial No. 132,691 filed August 31st, 1926.

The air rejecting structure may be disposed within or without the reservoir, as an element distinct from both the anti-cavitation device and the check valve. Thus, the air rejecting structure may have an air separating chamber into which the pump discharges, which chamber is separate and distinct from the settling or drain chamber, from which the pump draws its charge.

In Fig. 3, I have shown a modified form of air rejecting check valve, devoid of the deflection plate 46, shown in Fig. 1 and suspended but little below the valve seat, which will preclude the formation of a sealing oil film, when a lighter grade of oil is employed. The valve shown comprises a sheet metal disk 81 faced with a seating disk 82 of oil-treated fibre board thereover and backed by a conical button 83 therebelow. The valve is normally suspended in open position below the seat 40' by a valve hanger comprising a sheet metal disk 84 encircled by the seating area of the facing disk and having a plurality of upstanding fingers 85 bent outward, to form stop flanges 86 normally resting on top of the cage 88, as shown. Rivet 87 centrally through the disk 81, its facing 82, the button 83 and the hanger 84 secures said parts together in a unitary structure. The periphery of the valve extending as it does laterally well beyond the valve port, hinders cavitation for reasons fully described in the foregoing. The conical button 83 in Fig. 3 serves as a guide to direct any air upward about the rim of the valve through the seat.

I claim:

1. A supply installation for a chassis lubricating system including a reservoir, a filling closure on said reservoir, a strainer therebelow, a filter disk below said strainer and above the reservoir bottom, and means venting said reservoir, said means including an air venting passage through said filter and having a lubricant-tight connection with respect thereto.

2. A lubricant reservoir having a storage chamber, a filter near the lower end thereof, a drain chamber below said filter, from which filtered lubricant is withdrawn for use, and a tube extending through said filter and having a lubricant-tight connection therewith and communicating with the atmosphere near its upper end in order to vent said drain chamber.

3. A lubricant reservoir having a filter extending across the entire base of said reservoir and sustaining the contents thereof, an outlet below said filter, a filling neck for said reservoir, and a vent pipe through said filter extending at its upper end into said neck and venting to the atmosphere both the chamber below and that above the filter.

4. A lubricant reservoir comprising a cylindrical side wall, a bottom and a filling neck, a filter disk having a rim clamped against the rim of said bottom, a strainer cup suspended from said neck, a vent pipe extending at its lower end downward through and secured to said filter disk, said neck provided with a bore lodging the upper end of said vent pipe, said bore vented both to the exterior and to the interior of said neck.

5. A lubricant reservoir comprising a cylindrical sheet metal side wall having a substantially circular inner contour with its lateral seam protruding from the exterior and a bottom piece having an upstanding rim within said side wall, a circular filter pad fitting into the side wall and resting upon the rim of said bottom piece, and a circular clamping frame within the side wall to clamp the rim of the felt against the bottom piece.

6. A lubricant reservoir comprising a cast vessel forming a bottom, a cylindrical sheet metal wall about said bottom, a filter pad resting upon the rim of said bottom, a lock frame within the wall of said reservoir pressing said filter toward the rim of said bottom, the inner rim of said frame and the upper rim of said vessel having opposed ledges to thereby form an annular clamping constriction about the rim of said filter.

7. A lubricant reservoir as claimed in claim 3, in which a sustaining structure supports the spanning area of the filter without material reduction of the effective filtering area thereof.

8. A lubricant reservoir having a cast vessel forming a bottom, a cylindrical sheet metal side wall secured at its lower end to the upper part of said vessel, a filter disk resting upon the rim of said vessel and secured near its periphery in lubricant-tight relation with respect to said reservoir wall, a vent pipe normally communicating with the atmosphere, extending upward through said filter pad, a backing cup below said filter pad, means securing said cup and said pipe against said filter pad, said reservoir having a filling neck into which the upper end of the vent tube extends and a plurality of lugs formed integral within the bottom vessel, to sustain the rim of said backing cup.

9. The combination set forth in claim 8 in which the backing cup is of diameter smaller than the filter and has venting apertures near its upper rim to afford ready escape of air from between the side wall of said cup and the side of the bottom vessel.

10. An automatic air rejecting device for a pressure lubricating installation, said device comprising a valve seat, a valve normally held from its seat, a settling chamber enclosing said valve and said seat and of diameter at said valve substantially larger than that of said valve and affording an inlet for the charge ejected from a source of pressure, said inlet directed laterally into the chamber, whereby any jet injected into said chamber will not be applied directly at the valve, said valve and seat being constructed and arranged to cause any air separated in the chamber to escape from between said valve and its seat before valve closure by the flow of oil thereagainst.

11. An automatic air rejecting device for a pressure lubricating system comprising a casing, a valve seat in said casing, a valve normally sustained by gravity below said seat by a gap sufficient to prevent the formation of a resistant film of oil between the rim of the valve and the seat, said casing constituting a settling chamber having an inlet port below said valve through which lubricant is admitted from a source of pressure, said port directed laterally into the chamber, whereby the chamber below said valve will serve to dissipate the energy of any jet and whereby in operation any air in the chamber is caused to escape about the valve before the latter is lofted to its seat by the rise of the lubricant.

12. An automatic air rejecting device for a central pressure lubricating system, said device comprising a casing provided with a vent and including a valve seat, a disk valve normally suspended below said seat and exposing substantially the entire area of the valve to the flow of oil thereagainst from therebelow, a jet dissipating chamber below said valve, said chamber having an inlet port directed to deliver the jet discharged from the source of pressure laterally into said chamber.

13. An automatic air rejecting device for a central pressure lubricating system, said device comprising a frusto-conical jet dissipating chamber having a downwardly facing valve seat near the upper and larger end thereof, a disk valve normally below said valve seat, said chamber having an inlet port delivering laterally into the lower end thereof for connection to the source of lubricant pressure, and means to prevent loss of any lubricant ejected past the valve.

14. An automatic air rejecting device for a central pressure lubricating system, said device comprising a frusto-conical jet dissipating chamber having a downwardly facing valve seat near the upper end thereof, a disk valve normally suspended below said valve seat, said chamber having an inlet port delivering laterally into the lower end thereof and for connection to the source of lubricant pressure, means to retain against loss, any lubricant ejected past the valve, and means to vent any air rejected past the valve.

15. An automatic air rejecting device for a pressure lubricating system comprising a cup having an annular valve seat member secured in the upper end thereof, a disk valve having a hanger device secured thereto extending through said valve seat member and resting at its upper end upon said valve seat member to sustain the valve therebelow and exposing substantially the entire area of the valve to the flow of oil thereagainst from below, said cup having an inlet port near the lower end thereof, adapted to direct laterally a jet admitted thereto from the source of pressure.

16. An automatic air rejecting device for a central pressure lubricating system, comprising a frustro-conical jet dissipating chamber, a valve seat secured in the upper part of said chamber, a disk valve having a hanger attached thereto extending through said seat and suspending said valve by gravity below said seat, said chamber having an inlet port near the lower end thereof for connection to the source of pressure and inclined away from said valve, said valve responding to the flow of oil thereagainst by virtue of the viscosity of the oil to be levitated toward its seat and remaining open under the effect of the air flowing thereagainst in operation.

17. An automatic air rejecting device for a central pressure lubricating system comprising a frustro-conical jet dissipating chamber, a valve seat secured in the upper part of said chamber, a disk valve having a hanger attached thereto extending through said seat and suspending said valve by gravity below said seat, said chamber having an inlet port near the lower end thereof inclined away from said valve and adapted for connection to the source of pressure, said valve responding to the flow of oil thereagainst by virtue of the viscosity of the oil to be levitated toward its seat, said valve being upwardly bevelled about the rim of its lower face to facilitate the escape without seating said valve, of any air from the jet dissipating chamber.

18. An automatic air rejecting device for a central pressure lubricating system, said device comprising a jet dissipating chamber, an annular valve seat near the upper end thereof, a valve comprising a solid metal button normally suspended substantially below said seat, and means connected to said valve and normally extending above said seat in the path of oil flow through the valve, and serving to assist the levitation of said valve to its seat.

19. An automatic air rejecting device for a central pressure lubricating system, said device comprising a chamber closed at its bottom and open at its top, an annular valve seat near said top, a solid metal disk valve, a hanger secured to said valve, resting upon said valve seat and normally sustaining said valve by gravity well below its seat, and a deflection plate secured to said valve extending above said seat and having an outwardly flaring rim in the path of lubricant flow from out of the chamber between the valve and its seat, whereby said deflection plate will assist in raising the valve to its seat during operation of the source of pressure, said chamber having an inlet port extending laterally thereinto from near the lower end thereof.

20. An automatic air rejection device for a central pressure lubricating system, said device including a chamber, to be subjected to pressure from the operating source, said device including a valve seat near the upper end thereof, a sheet metal valve hanger having fingers resting upon said seating member and extending through the opening therein, a metal valve button having a bevelled edge and secured to said hanger to be normally suspended substantially below its seat, and a deflection plate comprising a sheet metal cup secured to said valve hanger assembly and extending upward through said valve seat and having an outwardly flaring curved rim sloping downward at its outer edge and extending above the valve seat.

21. An automatic air rejecting device for a central pressure lubricating system, said device including a chamber to be subjected to pressure from the operating source, said chamber including a valve cage near the upper end thereof, a disk valve, a hanger resting on top of said cage and sustaining said valve suspended substantially below its seat, said valve having secured thereto a cup-shaped deflector provided with an outwardly extending rim flaring downward at its outer edge and clearing the valve cage, said cage having an upstanding rim extending into the concavity determined by said curved flange.

22. An automatic air rejecting device for a central pressure lubricating system comprising a jet dissipating chamber in the course of lubricant flow from the source of pressure to the bearings, said chamber having a valve seat near the top thereof, a valve suspended below said seat, said valve comprising a flat seating face and a light conical button therebelow.

23. A lubricant reservoir having a drain port, a drain cup therebelow, an outlet from said cup through which lubricant may be withdrawn by suction, and a deflection member of diameter larger than said port extending transversely thereacross beyond the periphery of said port and serving to prevent direct downward application of suction at the port, thereby hindering cavitation.

24. A lubricant reservoir having a drain port, a settling cup therebelow, an outlet from said cup through which lubricant may be withdrawn by suction, and a deflection member of diameter larger than said port extending thereabove and transversely thereacross beyond the periphery thereof, and serving to prevent direct downward application of suction at the port, thereby hindering cavitation, and check valve means automatically closed during pressure propulsion of the charge withdrawn from the reservoir, in order to prevent return flow of lubricant to the reservoir through said port.

25. A lubricant reservoir having a drain port, a settling cup therebelow, said drain port of substantial diameter, said settling cup having an outlet to which suction may be applied for withdrawing lubricant therefrom and past said port, and a deflection plate member of diameter larger than said port, said plate member having a rim extending outwardly above and laterally beyond said port to permit the drawing of lubricant from thereabove only by lateral flow inward between said deflection plate and the wall of said port, thereby hindering cavitation.

26. A lubricant reservoir having an axial drain port, a settling cup therebelow, said drain port of substantial diameter, said settling cup having an outlet at which suction may be applied for withdrawing lubricant therefrom and past said port, and a deflection plate member of diameter larger than said port, said plate member extending outwardly above and laterally beyond said port, with its rim turned downward the wall of said port having an upstanding annular shoulder extending upward into the concavity of said curved rim.

27. A lubricant reservoir comprising a storage chamber, a settling cup therebelow, a filter pad extending transversely of said storage chamber near the lower end thereof, said settling cup having an outlet port at which suction may be applied to withdraw lubricant previously filtered through said pad, and having above the outlet port thereof, an inlet port of substantial area, and a deflecting member of diameter larger than said inlet port extending contiguous thereto and laterally therebeyond to hinder cavitation by causing the suction to be applied radially rather than axially of said port.

28. A lubricant reservoir comprising a cylinder storage chamber having a settling cup extending therebelow, a valve seat near the upper part of said settling cup and having a port therethrough, a valve normally held by gravity below said seat, a deflecting member of diameter larger than said valve seat port, extending contiguous thereto beyond the periphery thereof and preventing direct axial flow of lubricant through said port when suction is applied at said settling cup, thereby hindering cavitation, said reservoir having a filter pad for intercepting any solid particles from lubricant emitted thereby, said filter pad being in a position such as not to interfere with the application of suction at the lubricant in said settling cup.

29. A lubricant reservoir comprising a unitary cast vessel forming a bottom, and adapted to be secured to the dashboard of a motor vehicle, said bottom including a downwardly extending cup of reduced diameter, a cylindrical sheet metal casing wall supported at the rim of said bottom, said cup having an inlet port at the upper part thereof, an outlet port near the lower end of said cup to which suction may be applied from a pump, a plate adjacent said inlet port and extending contiguous thereto and beyond the periphery thereof, whereby the direct downward application of suction through said port and consequent cavitation is prevented, and a check valve to limit return of lubricant to the reservoir during the pressure operation of the pump.

30. A lubricant reservoir comprising a cast vessel forming a bottom and comprising a circular tray having unitary therewith a downwardly extending reduced cup closed at its lower end, a sheet metal reservoir wall supported about said tray, said cup having a suction port near the lower end thereof, from which lubricant may be withdrawn by the action of a pump, a valve seat member secured in the upper end of said cup, and a valve supported below said seat member and responding to the flow of oil thereagainst by virtue of the viscosity of the oil to become levitated against said seat, and to remain unseated under the effect of air flowing thereagainst in operation.

31. A lubricant reservoir for a pressure lubricating installation, comprising a vented casing having a check valve therein near the lower end thereof, normally held from its seat, a settling cup below said valve, a suction port at said cup, at which suction from a pump may be applied to withdraw a charge, said suction port being directed laterally so that the jet injected by return flow from the pump into the cup will not be applied directly at the valve and any air included in the jet will separate and rise from the cup before the oil reaches the check valve.

32. A lubricant reservoir having a suction outlet near the lower end thereof, from which a charge may be withdrawn by a pump for application into a pipe line, said reservoir having a check valve therein above said outlet and determining a jet dissipating chamber below said check valve larger at its upper than at its lower end, said check valve comprising a disk normally held by gravity below its seat, constructed and arranged to be levitated by the flow of oil thereagainst in the pump discharge by virtue of the viscosity of the oil, whereby said valve will remain unseated so as to permit rejection of air.

33. A lubricant reservoir for a pressure lubricating system including a bottom casting having a downwardly extending cup, a valve cage in the upper part of said cup, a check valve button suspended from said cage below its seat and exposing substantially the entire area of the valve to the flow of the oil thereagainst from therebelow, said cup having a suction port through which a charge of oil may be withdrawn by a pump, said valve being of character such as to be levitated by flow of oil thereby against its seat and by virtue of the viscosity of the oil, and to remain below its seat for facilitating the escape of air thereby.

34. A lubricant reservoir having a jet dissipating cup at the bottom thereof, a suction port at said cup, through which a charge of oil can be withdrawn by a pump, a valve cage in the upper part of said cup, a check valve having a hanger resting on top of said cage and suspending said valve below its seat, and a deflection plate secured to said valve and having a rim extending outward above said cage.

35. A lubricant reservoir having a jet dissipating cup at the bottom thereof, a suction port at said cup, through which a charge of oil can be withdrawn by a pump, a valve cage in the upper part of said cup, a check valve having a hanger resting on top of said cage and suspending said valve below its seat, and a deflection plate secured to said valve and having a rim extending outward above said cage, said rim being curved downward at its periphery, said cage having an upstanding flange at its upper part extending into the concavity but clear of said rim.

36. A reservoir having a filter pad peripherally clamped therein, a valve cage fixed in said reservoir below said filter pad, a valve therein normally retained open by gravity, said reservoir having a chamber below said valve cage to receive lubricant passed through said filter, and vent means extending across the thickness of said filter pad to permit rapid removal of lubricant from the chamber without creating a vacuum below the filter.

37. A reservoir having a filter pad peripherally clamped therein, a valve cage fixed in said reservoir below said filter pad, a valve therein normally retained open by gravity, said reservoir having a chamber below said valve cage of volume sufficient for a pump charge, a port in said chamber through which pressure from a pump is applied to the walls thereof, to loft said valve to its seat for sustaining said pressure, thereby protecting said filter pad from the application of pump pressure thereagainst.

38. A reservoir having a filter disk peripherally clamped, a valve cage fixed in said reservoir below said disk, a valve therein normally retained open by gravity, said reservoir having a pump jet dissipating chamber below said valve cage, and a vent pipe extending through said filter disk and fixed therein in lubricant-tight relation, said pipe having a substantially dust-tight venting outlet to vent the reservoir both above and below the filter disk.

39. A lubricant reservoir for a pressure lubricating system, including a concave bottom structure, a filter extending across said bottom structure and secured at its periphery upon the upper rim of said bottom structure, a check valve supported within said bottom structure between the lower and upper ends thereof, a suction port in said bottom below said valve through which a charge can be withdrawn by a pump, said valve being of disk form and of character such as to be levitated by flow of oil thereagainst by virtue of the viscosity of the oil, and to remain below its seat for facilitating the escape of air thereby.

40. A lubricant reservoir for a pressure lubricating system including a concave bottom structure, a filter extending across said bottom structure, a check valve supported within said bottom structure between the lower and upper ends thereof, a seat for said valve, a suction port in said bottom below said valve through which a charge can be withdrawn by a pump, said valve being of disk form and of character such as to be levitated by flow of oil thereagainst by virtue of the viscosity of the oil and to remain below its seat for facilitating the escape of air thereby, and a deflection plate associated with said valve and extending peripherally beyond the port through the valve seat, for preventing cavitation.

41. A lubricant reservoir having a concave bottom, a filter pad extending transversely across the area of said reservoir and clamped at its periphery above said bottom, said bottom having an upper port therein of reduced area, having a suction port therebelow through which lubricant can be withdrawn by a pump, and a deflection plate extending over said upper port in the neighborhood thereof and peripherally therebeyond to prevent cavitation.

42. An air rejecting device for a pressure lubricating installation, said device comprising a chamber sufficiently large to permit separation of oil and air by settling and having an inlet to be connected to a source of pressure and an automatic selective element at the upper part of said chamber constructed and arranged to freely vent any air from the chamber under substantially atmospheric pressure and sustaining the pressure of lubricant, said device having an associated outlet port, said inlet and outlet ports affording separate paths for concurrent connection in parallel to a source of pressure.

43. An automatic air rejecting device for a pressure lubricating installation, said device comprising a chamber sufficiently large to permit separation of oil and air by settling and having an inlet for connection to a source of pressure, means near the upper part of said chamber affording an air vent, the parts contiguous to said vent sloping upward to facilitate the passage therethrough under substantially atmospheric pressure of any air in the chamber, said air vent operating selectively to resist the escape of lubricant therebeyond, by virtue of the viscosity of the lubricant, said device having an associated outlet port, said inlet and outlet ports affording separate paths for concurrent connection in parallel to a source of pressure.

44. An automatic air rejecting device for a central pressure lubricating installation, said device comprising a chamber having an inlet for connection to a source of pressure, an air venting device near the upper end of said chamber resisting the escape of lubricant by virtue of the viscosity of the lubricant, and protective means to prevent the passage of foreign particles to the venting device, said protective means being itself vented.

45. An automatic air rejecting structure for a central pressure lubricating system, said structure comprising a settling cup provided with a drain port through which it is filled with lubricant, an annular valve seating part in said cup, a selective valve below said seat constructed and arranged to remain unseated for permitting the rejection of any air in said cup and to be levitated to its seat by the flow of lubricant thereagainst and by virtue of the viscosity thereof, and a pump mounting socket rigid with said cup, said socket having an inlet to the cup and affording an outlet spaced throughout its length from the interior of the cup.

46. An automatic air rejecting device for a central pressure lubricating system having a settling cup provided with a draining port through which it is filled with lubricant, a valve cage in said cup having a seat and a selective disk check valve sustained by said cage below said seat, and raised to its seat under pressure during operation of the system, by virtue of the viscosity of the lubricant, said valve being constructed and arranged to remain open during pump operation, until any air in the settling cup has been raised therepast.

47. An element of a lubricant reservoir, said element comprising a unitary casting including a tray having unitary therewith a reduced chamber therebelow, said chamber having a socket laterally in a correspondingly thickened part thereof, for accommodation of the end of a pump cylinder, the upper rim of the tray having a peripheral ridge to aid in clamping the periphery of a filter disk to rest thereon.

48. A lubricant reservoir having a valve seat near the bottom thereof, a check valve of substantial area normally retained in open position below said seat and having substantially the entire area thereof below its outer periphery exposed to the rise of oil therepast, said valve having a part loosely correlated with respect to said seat for centering thereof when raised toward said seat by the flow of oil, the gap between the valve and its seat being so large as to vent any air supplied with the oil.

Signed at New York city in the county of New York and State of New York this 25th day of August, A. D. 1926.

JOSEPH BIJUR.